US008011278B1

(12) United States Patent
Loper

(10) Patent No.: US 8,011,278 B1
(45) Date of Patent: Sep. 6, 2011

(54) PUNCHING APPARATUS

(75) Inventor: Thomas Loper, Wilbraham, MA (US)

(73) Assignee: Jain (Americas) Inc., Columbus, OH (US)

(*) Notice: Subject to any disclaimer, the term of this patent is extended or adjusted under 35 U.S.C. 154(b) by 677 days.

(21) Appl. No.: 11/750,457

(22) Filed: May 18, 2007

Related U.S. Application Data

(60) Provisional application No. 60/747,629, filed on May 18, 2006.

(51) Int. Cl.
*B23D 25/02* (2006.01)
*B23D 15/00* (2006.01)

(52) U.S. Cl. ............. 83/37; 83/111; 83/156; 83/435.23; 83/734; 83/436.7

(58) Field of Classification Search .................... 83/734, 83/436.1, 436.15, 436.3, 436.7, 435.23, 435, 83/111, 156, 37; 493/63, 67, 64, 364, 365, 493/370
See application file for complete search history.

(56) References Cited

U.S. PATENT DOCUMENTS 3,106,859 A * 10/1963 Huffman ........................ 83/345
3,279,290 A * 10/1966 Stemmler ........................ 83/26
4,198,886 A * 4/1980 Bowers et al. .................. 83/112
4,269,093 A * 5/1981 Nickum .......................... 83/174
4,273,015 A * 6/1981 Johnson .......................... 83/670
4,688,459 A * 8/1987 Osborn et al. ............. 83/698.31
4,928,562 A * 5/1990 Tanimura et al. ............... 83/278
5,879,278 A * 3/1999 Cox ................................ 493/67
5,887,502 A * 3/1999 Yamaguchi et al. .............. 83/76
6,325,952 B1 * 12/2001 Jarrett et al. ................. 264/37.3
7,507,464 B2 * 3/2009 Walrath ........................ 428/203

* cited by examiner

*Primary Examiner* — Boyer D Ashley
*Assistant Examiner* — Omar Flores-Sáchez
(74) *Attorney, Agent, or Firm* — Doherty Wallace Pillsbury & Murphy

(57) ABSTRACT

A punching apparatus for forming a series of slots in a board, comprising: an upper wheel and a lower wheel, wherein the upper wheel is opposed to the lower wheel, and further wherein: the upper wheel comprises a series of punches disposed on a frame of the upper wheel, wherein each punch comprises a shearing portion that extends from the frame, and which is configured in the shape of a slot; and the lower wheel comprises a series of mating dies, wherein each mating die of the series of mating dies comprises a cavity, wherein the shearing portion of a particular punch is gradually disposed within the cavity of a particular mating die of the series of mating dies as the upper wheel and the lower wheel move in relation to each other.

3 Claims, 4 Drawing Sheets

PUNCHING APPARATUS

CROSS REFERENCE TO RELATED APPLICATIONS

This application claims the benefit of U.S. Provisional Application No. 60/747,629 filed on May 18, 2006.

BACKGROUND OF THE INVENTION

1. Field of the Invention

The present invention is generally related to an apparatus for punching. More particularly, this invention is related to an apparatus for punching slots into profiled cellular polyvinylchloride (cellular PVC) boards, wherein an exemplary application of such punched, profiled cellular PVC is in the use as siding.

2. Background of the Invention

This invention relates to a novel apparatus for punching slots into profiled cellular PVC boards to be used as siding. Slot punching of cellular PVC boards at the required production throughput rate demands an entirely unique approach to achieve the required slot punching accuracy as compared to prior art punching apparatuses used to punch traditionally used rigid vinyl siding materials.

Conventional high speed rigid rotary vinyl siding slot punching consists of a single rotary punching wheel, combined with two lower stationary side cutting blades. This conventional arrangement is typically located just downstream of the extruder on a vinyl siding extrusion line, punching through just extruded, warm vinyl. The geometry of this conventional arrangement shears the slot sides but does not perform actual punch/die shearing of the slot ends. In warm, newly extruded vinyl, this lack of shearing of the slot ends does not pose a problem and slots are punched with relatively clean slot ends.

Profiled cellular PVC boards are milled from previously extruded cellular PVC sheets. The material has been cured and is therefore harder and more brittle than warm cellular PVC. Profiled cellular PVC boards punched with the above described conventional arrangement, show significant breakage along the shear line, uneven cuts and structural fractures in the slot vicinity due to not fully shearing the entire slot. Therefore, the conventional slot punching arrangement is totally inadequate for forming slots in cellular PVC boards. Accordingly, a new approach is needed that would punch slots in cellular PVC material at the required rates, wherein all of the exposed sides of the slot are sheared. Additionally, specially contoured and coated tooling is required when punching cellular PVC material due to its highly abrasive qualities, as compared to conventional vinyl siding material.

BRIEF SUMMARY OF THE INVENTION

The foregoing needs have been satisfied by the development of a unique rotary type slot punching apparatus of extreme speed, precision and robustness that incorporates unique and innovative cellular PVC processing techniques such as special tooling design and coatings and electrostatic charge abatement. More particularly, the present invention incorporates a unique approach to siding slot punching by utilizing two opposed, precision, counter-rotating wheels: the upper wheel having punches and the lower wheel having a series of mating dies complementary to the punches in the upper wheel. These punches and their mating dies incorporate cutting edges on the entire periphery of the slot shape thereby providing full shearing of the entire slot including the ends.

DETAILED DESCRIPTION OF THE INVENTION

The punching apparatus of the present invention forms slots in boards, wherein an exemplary use of the slotted boards is as siding material. Although the boards may comprise a variety of materials, in an especially preferred embodiment the board comprises cellular PVC. The inventive punching apparatus offers a novel approach for the formation of slots in the nailing flange area of the board, wherein the punching apparatus is designed to shear all of the exposed sides of the slot, and not merely just the slot's lateral sides as is done in conventional punching operations. To accomplish this, the inventive punching apparatus comprises a plurality of punches disposed about a frame of an upper wheel. Each of the punches forming the plurality comprise a shearing portion that extends from the frame, and which is configured to fit within a cavity of a respective mating die located on a lower wheel. The shearing portion comprises a geometrical shape and size to match that of the desired geometrical shape and size of the slot to be formed in the board. The board is disposed between the upper and the lower wheels. Therefore, as the upper and lower wheels continuously rotate, thereby causing the shearing portion of the punch to progressively enter the cavity of the mating die, the shearing portion progressively punches through the board leaving a slot having the same configuration as the punch. Continuous rotation of the upper wheel and the lower wheel as the board drives through the punching apparatus results in the formation of a slotted board having improved working characteristics as compared to boards formed using traditional punching methods.

An exemplary punching apparatus and punching operation will be discussed below with reference to the figures. However, it is to be understood that the invention shall not be limited to the exemplary embodiments depicted in the figures, but that it shall include all obvious modifications and variations thereto that would occur to one of ordinary skill in the art.

Figure 1:
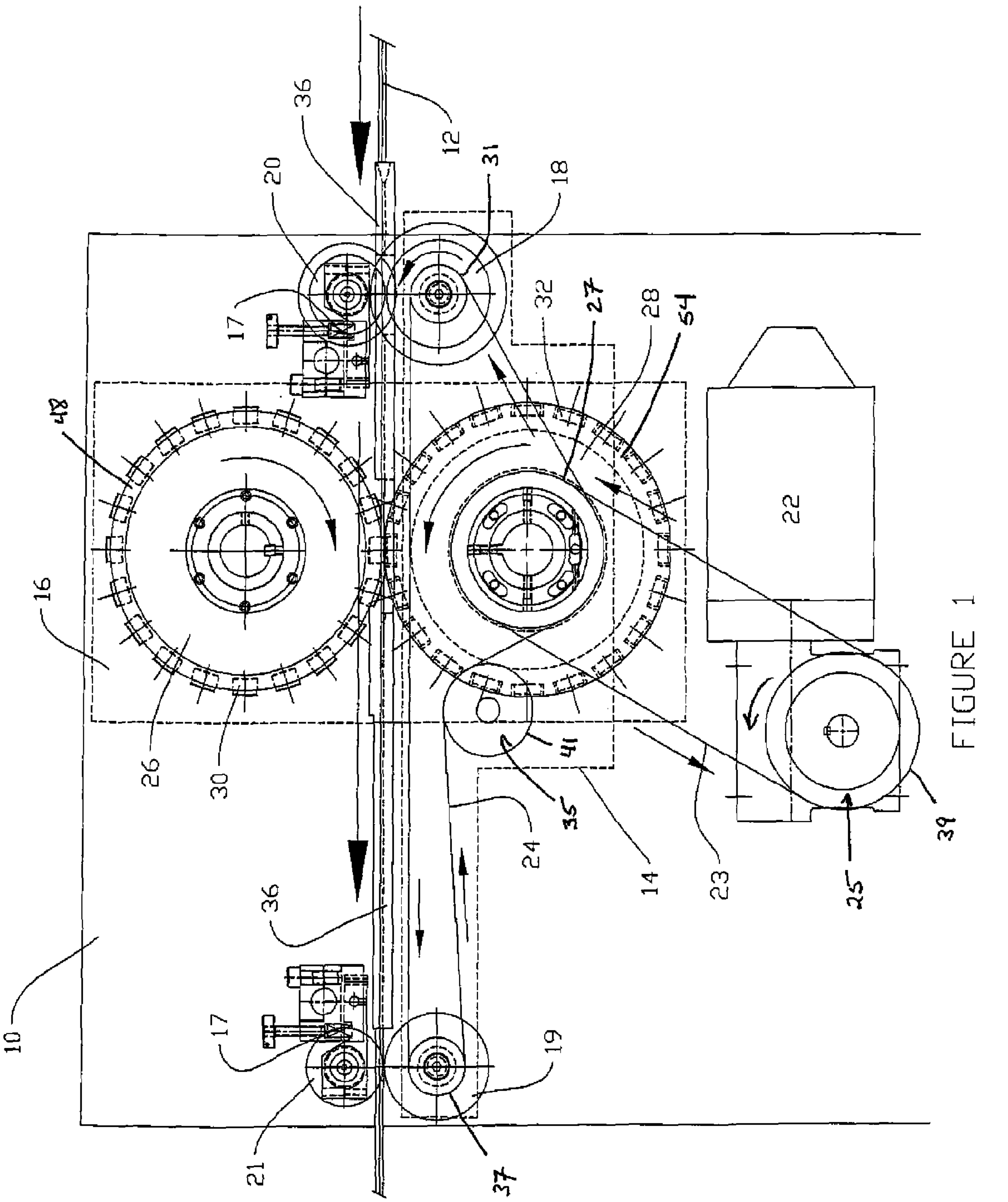
FIG. 1 is a schematic depicting an elevation view of an exemplary punching apparatus.
Figure 2:
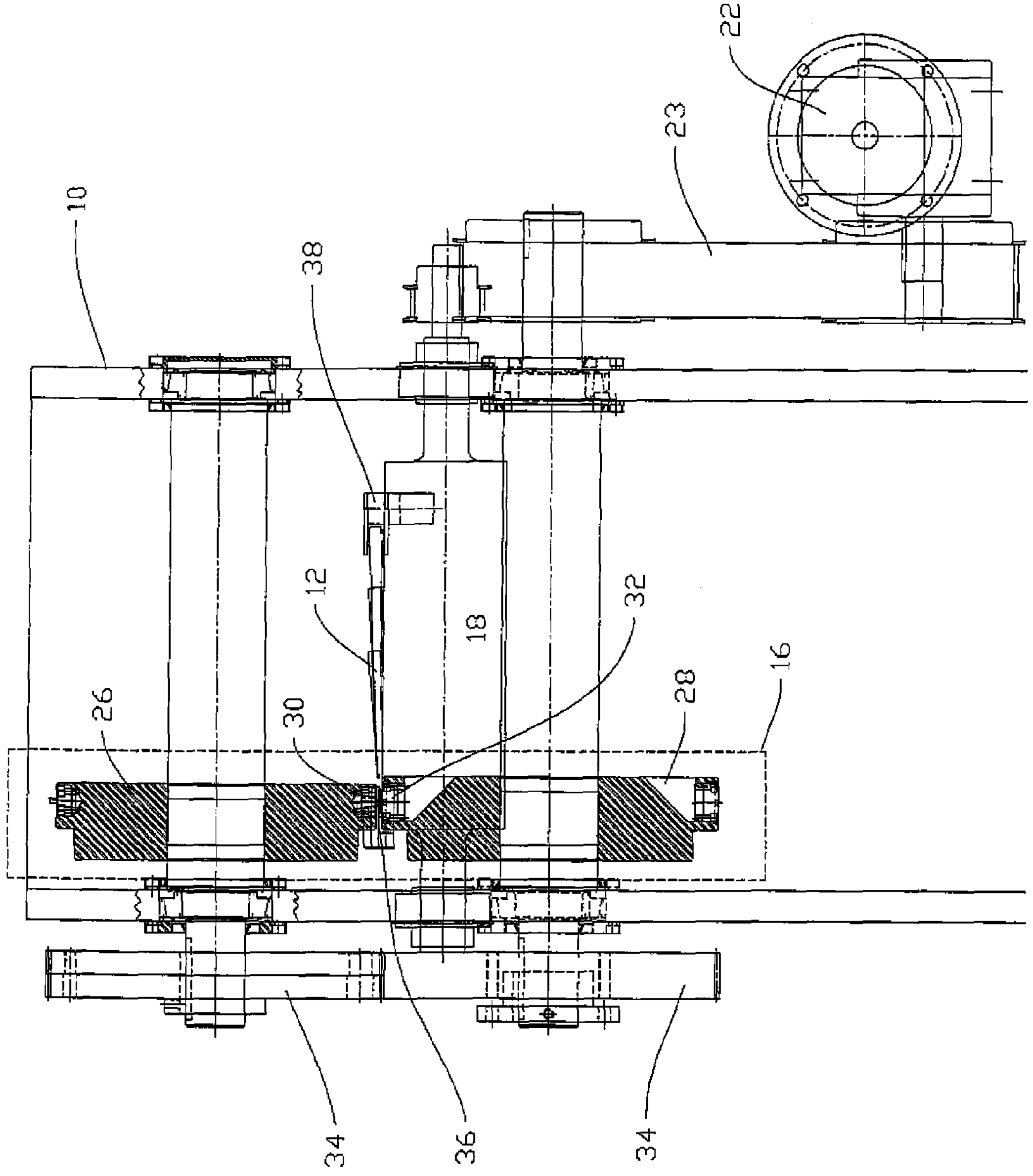
FIG. 2 is a schematic depicting an in-feed end view of an exemplary punching apparatus.
Figure 3:
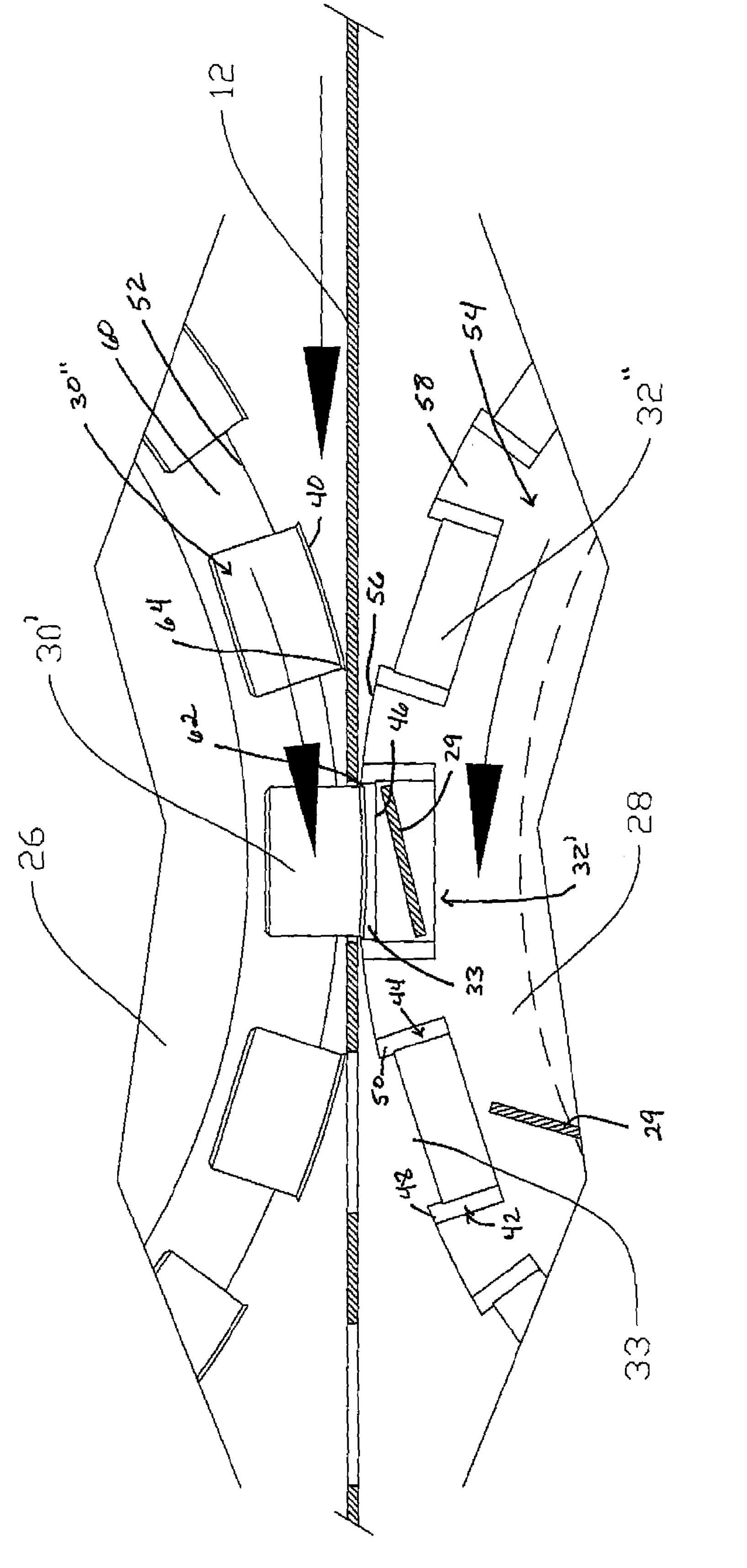
FIG. 3 is a schematic depicting a detail of the slotting process.

Referring to FIGS. 1-3, a profiled cellular PVC board 12 may be longitudinally fed into an exemplary punching apparatus 10 in continuous motion fashion, lying flat. Punching apparatus 10 comprises a uniquely designed nip roll drive 14 and a rotary punch and die mechanism 16.

In an exemplary embodiment, nip roll drive 14, which is powered and synchronized by rotary punch and die mechanism 16, through timing belts 23 and 24, preferably comprises two lower drive wheels 18 and 19 and two articulated upper pressure wheels 20 and 21. In an exemplary embodiment, lower drive wheels 18 and 19 are hardened and comprise ground tool steel, and articulated upper pressure wheels 20 and 21 are urethane coated, wherein the urethane coating provides an excellent compromise between grip, damage protection, and wear.

Upper pressure wheels 20 and 21 may be actuated by adjustable compression springs 17. Lower drive wheels 18 and 19, which are powered by a gear motor 22 via a timing belt 24, work in concert with upper pressure wheels 20 and 21 to firmly grasp and propel cellular PVC board 12 between an upper wheel 26 and a lower wheel 28 of rotary punch and die mechanism 16. This drive preferably incorporates a datum fence 36 to accurately align and position cellular PVC board 12 for punching. Cellular PVC board 12 may be kept in constant contact with datum fence 36 by an opposing adjustable guide fence 38. In operation, the cellular PVC boards will preferably enter the punching area in continuous motion fashion.

As previously mentioned, rotary punch and die mechanism 16 comprises upper wheel 26 and lower wheel 28, wherein upper and lower wheels 26 and 28 oppose each other, and wherein, in combination, upper and lower wheels 26 and 28 perform the actual physical punching operation. In an exemplary embodiment, each of upper and lower wheels 26 and 28 comprises a diameter of approximately 11 inches.

Figure 4:
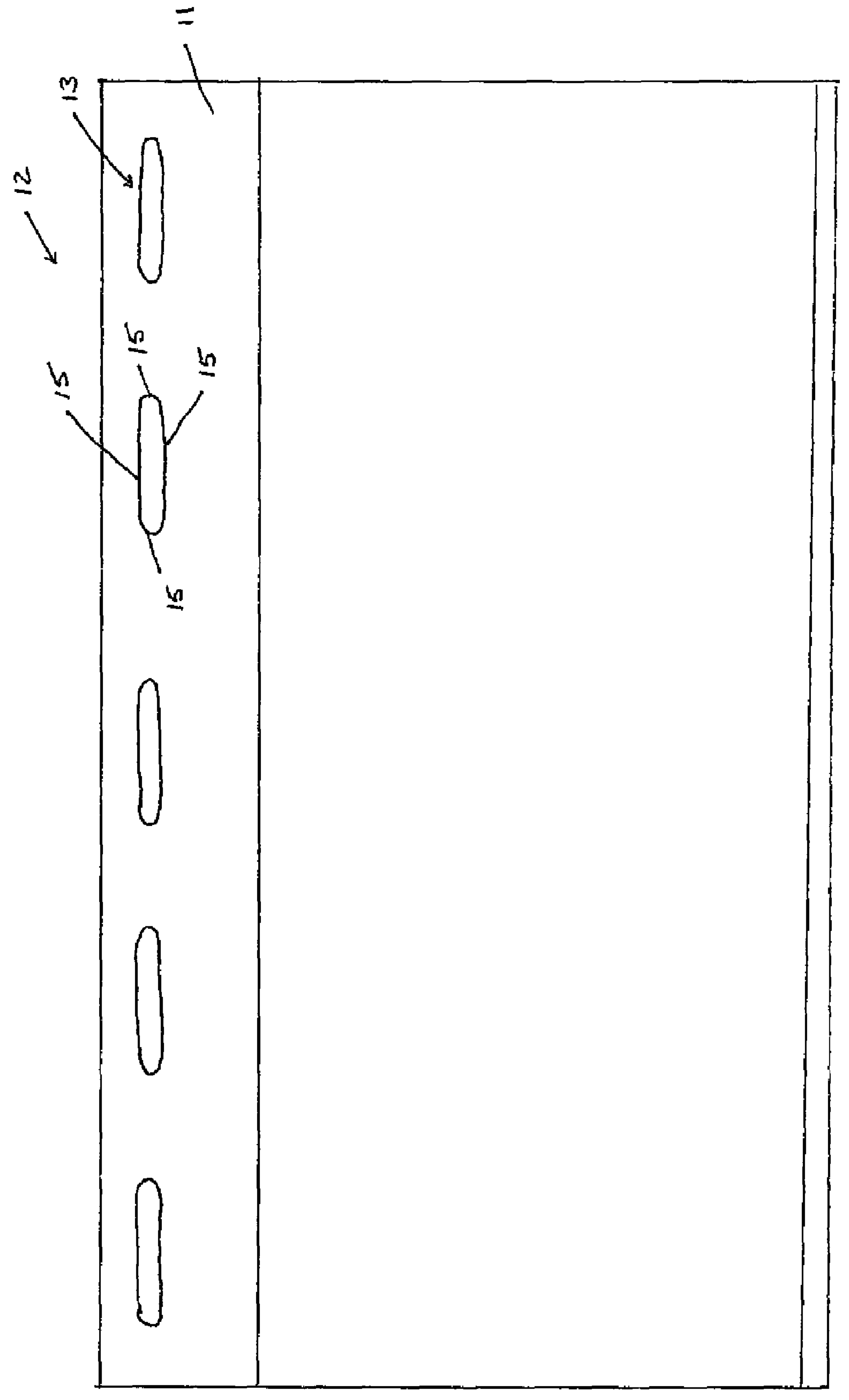
FIG. 4 is a schematic depicting an exemplary cellular PVC board.

In an exemplary embodiment, upper wheel 26 comprises a plurality of specially coated and contoured punches 30 equally spaced around an outer periphery 60 of a frame 48 of upper wheel 26. Each punch 30 comprises a shearing portion 40 which extends outwardly from frame 48 such that an outer edge 52 of frame 48 is recessed in relation to shearing portion 40. Shearing portion 40 is configured in the shape of the slot to be formed in cellular PVC board 12. For example, to form a slot 13 as depicted in FIG. 4, shearing portion 40 of punch 30 comprises an identical geometry to that of slot 13. As the entire slot is formed by a single punch 30, all of the exposed sides 15 of slot 13 would be properly sheared upon formation of slot 13. In an exemplary embodiment, plurality of punches 30 comprises about 20 individual punches.

Additionally, in an exemplary embodiment, lower wheel 28 comprises a plurality of specially coated mating dies 32 equally spaced around an outer periphery 58 of a frame 54 of lower wheel 28. Each of mating dies 32 comprises an upper boundary 46 that is recessed relative to an outer edge 56 of frame 54. Additionally each of mating dies comprises a lateral edge 42 opposite to a lateral edge 44, wherein upper boundary 46 is disposed therebetween such that a portion 48 and 50 of respective lateral edges 42 and 44 extends above top edge 46, thereby causing formation of a cavity 33. Lateral edges 42 and 44 are preferably flush with outer edge 56. Preferably, the number of mating dies forming plurality of mating dies 32 is equal to the number of punches forming plurality of punches 30.

Upper and lower wheels 26 and 28 are preferably synchronized by a set of precision, anti-backlash gears 34, which may be powered by electric-driven gear motor 22 and timing belt 23. It is preferable that anti-backlash gears 34, upper wheel 26, and lower wheel 28 have approximately the same diameter to provide precise synchronization of the punching process.

Referring to the figures, cellular PVC board 12 is disposed between upper wheel 26 and lower wheel 28 and between articulated upper pressure wheels 20 and 21 and lower drive wheels 18 and 19. Referring to FIGS. 3 and 4, as upper and lower wheels 26 and 28 rotate in continuous fashion, and as cellular PVC board moves forward between upper and lower wheels 26 and 28, shearing portion 40 from a punch 30' progressively enters cavity 33 of mating die 32', thereby progressively piercing cellular PVC board 12 in a nailing flange area 11 of board 12. The progressive piercing of cellular PVC board 12 causes a slot blank 29 to be carved from cellular PVC board 12. Once completely carved from cellular PVC board 12, slot blank 29 is removed from mating die 32 by gravitational force. Slot blank 29, therefore, is replaced by the formation of a slot 13 in cellular PVC board 12, wherein slot 13 is shaped to the configuration of shearing portion 40. Once slot 13 is formed, and as rotation of upper and lower wheels 26 and 28 continues, shearing portion 40 is lifted out of cavity 33, wherein the punching process will continue with punch 30" and mating die 32".

The unique, continuous, rotary motion slot punching apparatus of the present invention will allow punching rates of up to approximately 1,400 slots per minute. Given the required slot spacing, this punching rate will allow the punching process to meet a desired product flow of at least about 200 feet per minute in a continuous motion, inline fashion. Thus, the slot punching throughput of this single apparatus will satisfy projected production requirements without the need for like parallel processes.

An exemplary punching process utilizing the inventive punching apparatus disclosed herein will be described with reference to the figures, wherein it is again to be appreciated that the process may include obvious variations and modifications thereto. Additionally, although the terms "clockwise" and "counterclockwise" are used to give a sense of orientation, it is to be understood that the directions of rotation may be the reverse of those stated.

Referring to FIG. 1, timing belt 24 is circuitously attached to lower wheel 28, lower drive wheel 18, and lower drive wheel 19 (i.e., timing belt 24 is disposed over a hub 31 of lower drive wheel, over a hub 37 of lower drive wheel 19, over a hub 41 of an intermediate wheel 35, and over a hub 27 of lower wheel 28). Rotational movement of lower wheel 28 causes movement of timing belt 24 over the various hubs, thereby causing the counterclockwise movement of lower drive wheel 18 and lower drive wheel 19. Additionally, compression springs 17 drive the rotational movement of respective articulated upper pressure wheels 20 and 21. Though the efforts of timing belt 24 and compression springs 17, board 12 is driven though punching apparatus 10.

As board 12 is driven through punching apparatus 10, lower wheel 28 and upper wheel 26 are rotated relative to each other to form slots in board 12. The rotational movement of lower wheel 28 is ultimately accomplished by a gear motor 22. When activated, e.g., turned on, gear motor 22 drives the counterclockwise rotation of a motorized wheel 25. Via timing belt 23, which is attached to a hub 39 of motorized wheel 25 and to a hub 27 of lower wheel 28, the counterclockwise rotational movement of motorized wheel 25 causes lower wheel 28 to rotate in a counterclockwise direction.

The counterclockwise rotational movement of lower wheel 28 drives the clockwise rotational movement of upper wheel 26. That is, referring to FIG. 3, as lower wheel 28 rotates, and as a greater portion of shearing portion 40 of punch 30' is exposed to cavity 33 of mating die 32', a gravitational force pulls shearing portion 40 of punch 30' into cavity 33 of mating die 32'. As lower wheel 28 continues to rotate, portion 50 of lateral edge 44 of mating die 32' pushes against an edge 62 of shearing portion 40 of mating die 32', thereby causing the rotation of upper wheel 26 in an oppositely directed rotational motion. Such push continues until outer edge 52 of upper wheel 26 abuts outer edge 56 of lower wheel 28. An edge 64 of sharing portion 40 of punch 30" then pushes against portion 48 of lateral edge 42 of mating die 32" to continue the rotation. The process continues until the power from gear motor 22 is deactivated.

In this manner, then, cellular PVC board 12 is driven through punching apparatus 10, and slots are evenly formed and distributed on cellular PVC board 12. Furthermore, as shearing portions 40 are configured in the shape of the slot, the process allows for the formation of slots having all of their exposed sides completely sheared in a single operation. This then, creates an improved product for the use of siding as the improved resulting clapboard shows significantly reduced breakage along the shear line, and significantly reduced uneven cuts and structural fractures in the slot vicinity.

Although the principles of the present invention have been illustrated and explained in the context of certain specific embodiments, it will be appreciated by those having skill in the art that various modifications beyond those illustrated can be made to the disclosed embodiment without departing from the principles of the present invention.

What is claimed is:

1. A method for forming a slotted profiled cellular polyvinylchloride siding board comprising:

conveying a cured, profiled cellular polyvinylchloride siding board between an upper wheel and a lower wheel, wherein:

the upper wheel comprises a series of punches disposed on an outer periphery of a frame of the upper wheel, wherein each punch comprises a shearing portion that extends from the frame, and which is configured in the shape of a slot; and the lower wheel comprises a series of mating dies formed on an outer periphery of a frame, wherein each mating die of the series of mating dies comprises a cavity which is recessed into the frame of the lower wheel; wherein conveying the profiled cellular polyvinylchloride siding board between the upper wheel and the lower wheel comprises:

disposing the cured, profiled cellular polyvinylchloride siding board between a first nip roll drive unit and a second nip roll drive unit, wherein the upper wheel and the lower wheel are disposed between the first nip roll drive unit and the second nip roll drive unit, wherein:

each of the first and second nip roll drive units comprises an articulated upper pressure wheel opposed to a lower drive wheel;

interconnecting a hub of the lower drive wheel of the first nip roll drive unit, a hub of the lower drive wheel of the second nip roll drive unit, and the hub of the lower wheel with a second timing belt; and interconnecting a hub of an intermediate wheel with the second timing belt, wherein the intermediate wheel is located between the lower wheel and the lower drive wheel of the second nip roll drive unit; and punching a slot into the cured, profiled cellular polyvinylchloride siding board to substantially shear all exposed sides of the slot comprising:

rotating the upper wheel and the lower wheel relative to each other, comprising:

attaching a first timing belt to a hub of the lower wheel and to a hub of a motorized wheel, wherein the motorized wheel is in communication with a gear motor; and activating the gear motor; and rolling the shearing portion of a particular punch into the cavity of a particular mating die such that the shearing portion penetrates through the cured, profiled cellular polyvinylchloride siding board.

2. A method for forming a slotted profiled cellular polyvinylchloride siding board comprising:

conveying a cured, profiled cellular polyvinylchloride siding board between an upper wheel and a lower wheel, wherein:

the upper wheel comprises a series of punches disposed on an outer periphery of a frame of the upper wheel, wherein each punch comprises a shearing portion that extends from the frame, and which is configured in the shape of a slot; and the lower wheel comprises a series of mating dies formed on an outer periphery of a frame, wherein each mating die of the series of mating dies comprises a cavity which is recessed into the frame of the lower wheel; wherein conveying the profiled cellular polyvinylchloride siding board between the upper wheel and the lower wheel comprises:

disposing the cured, profiled cellular polyvinylchloride siding board between a first nip roll drive unit and a second nip roll drive unit, wherein the upper wheel and the lower wheel are disposed between the first nip roll drive unit and the second nip roll drive unit, wherein:

each of the first and second nip roll drive units comprises an articulated upper pressure wheel opposed to a lower drive wheel;

interconnecting a hub of the lower drive wheel of the first nip roll drive unit, a hub of the lower drive wheel of the second nip roll drive unit, and the hub of the lower wheel with a second timing belt; and rotating the articulated upper pressure wheels of the first and second nip roll drive units via a first compression spring and a second compression spring, wherein the first compression spring actuates the articulated upper pressure wheel of the first nip drive roll unit, and the second compression spring actuates the articulated upper pressure wheel of the second nip drive roll unit; and punching a slot into the cured, profiled cellular polyvinylchloride siding board to substantially shear all exposed sides of the slot comprising:

rotating the upper wheel and the lower wheel relative to each other, comprising:

attaching a first timing belt to a hub of the lower wheel and to a hub of a motorized wheel, wherein the motorized wheel is in communication with a gear motor; and activating the gear motor; and rolling the shearing portion of a particular punch into the cavity of a particular mating die such that the shearing portion penetrates through the cured, profiled cellular polyvinylchloride siding board.

3. A cured, profiled cellular polyvinylchloride siding board formed from the method set forth in claim 2.

* * * * *